Patented June 17, 1924.

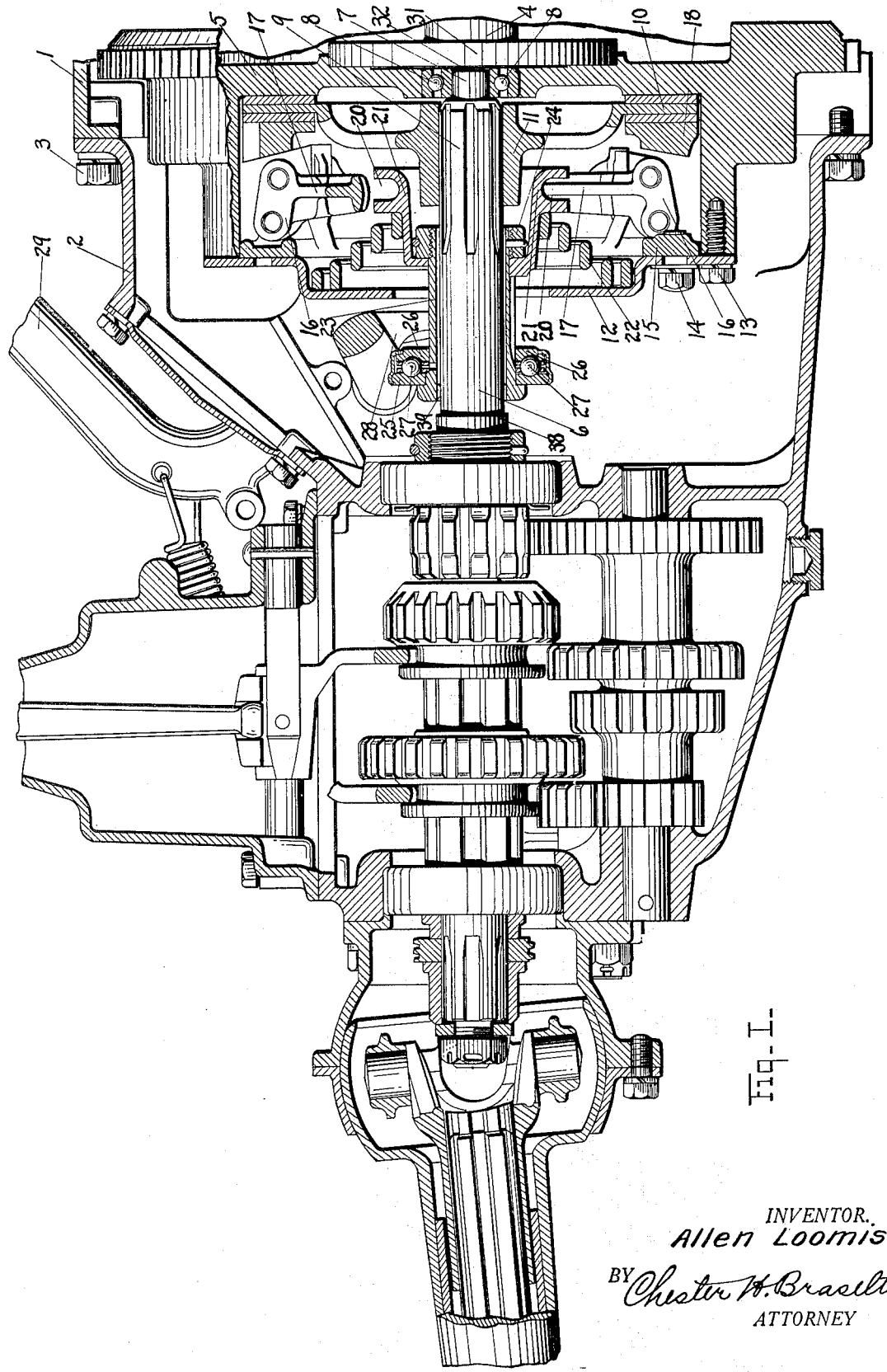

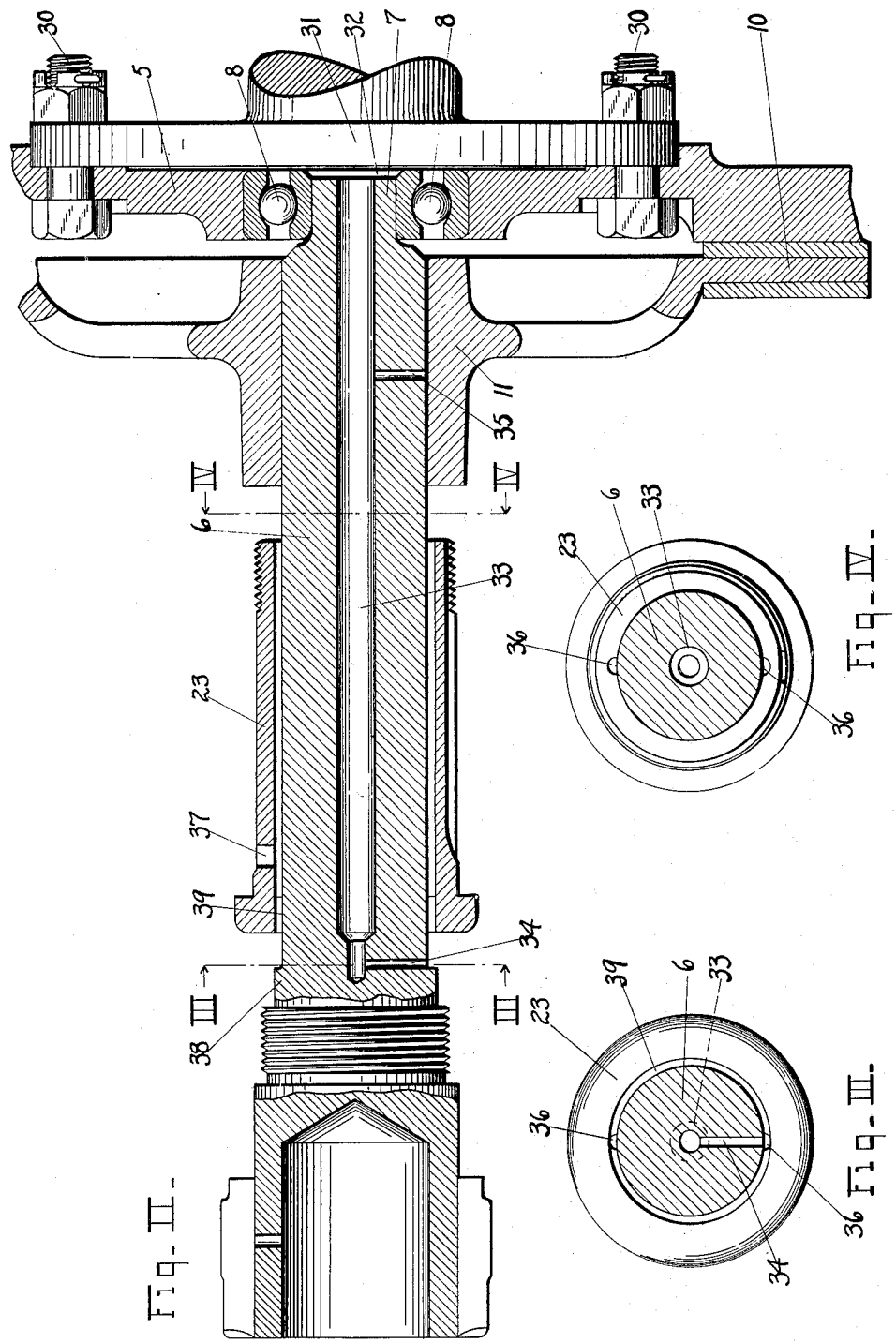

1,498,183

UNITED STATES PATENT OFFICE.

ALLEN LOOMIS, OF TOLEDO, OHIO, ASSIGNOR TO THE WILLYS-OVERLAND COMPANY, OF TOLEDO, OHIO, A CORPORATION OF OHIO.

LUBRICATING SYSTEM.

Application filed October 9, 1919. Serial No. 329,446.

*To all whom it may concern:*

Be it known that I, ALLEN LOOMIS, residing at Toledo, county of Lucas, State of Ohio, have invented certain new and useful Improvements in Lubricating Systems, of which I declare the following to be a full, clear, and exact description.

This invention relates to an improved lubricating system which while capable of general application is particularly designed for use in connection with the power transmission mechanism of motor vehicles.

Considerable difficulty has been experienced in providing proper lubrication for the clutch shaft of motor vehicles whereby oil may be suitably supplied to the bearings by which the shaft is supported, since the bearing from its position is somewhat inaccessible, and considerable difficulty is encountered in providing suitable automatic means for feeding oil to the bearing.

One object of the invention is to provide a simple and efficient form of lubricating system whereby oil is transmitted to the clutch shaft bearings of an automobile automatically.

A further object of the invention is to provide suitable means for lubricating a bearing through the interior portion of a hollow shaft.

A further object of the invention is to provide suitable means for automatically supplying oil to sleeves mounted upon a rotating shaft.

A further object of the invention is to provide suitable means for lubricating a shaft bearing whereby the supply of an excess quantity of oil to the bearing is eliminated.

Further objects of the invention relate to economies of manufacture and details of construction as will hereinafter appear from the detailed description to follow.

The objects of the invention are accomplished in one instance by the devices and means described in the following specifications, but it is evident that the same may be varied widely without departing from the scope of the invention as pointed out in the appended claims. A structure constituting one embodiment of the invention is illustrated in the accompanying drawings forming a part hereof in which:

Figure I is a vertical sectional view through the transmission and clutch mechanism of a motor vehicle illustrating the relative position of the clutch shaft with respect to the remaining parts of the mechanism.

Figure II is a longitudinal sectional view through the clutch shaft illustrating the position of the passages for supplying oil to the several bearings.

Figure III is a transverse sectional view, taken along the line III—III of Fig. II.

Figure IV is a transverse sectional view, taken along the line IV—IV of Figure II.

In the embodiment of the invention illustrated herewith, 1 indicates the engine casing of an automobile while 2 designates the transmission casing which is adapted to be secured to the engine casing by means of suitable bolts 3. An engine shaft 4 carries a fly wheel 5 firmly secured thereto at a point adjacent the rear end portion of the shaft, and a clutch shaft 6 is mounted in suitable bearings carried by the transmission casing and has a reduced end portion 7 extending in proximity to the rear end portion of the engine shaft and mounted in an anti-friction bearing 8 whereby the clutch shaft is capable of rotation independently of the engine shaft. The clutch shaft 6 is provided with a splined portion 9 adjacent the forward end thereof, and a clutch disc 10 is carried by a sleeve 11 slidably mounted upon the splined portion of the clutch shaft and retained against rotation relative thereto. A substantially circular plate 12 is secured to the rearwardly extending portion of the fly wheel in any suitable manned as by means of screws 13, and serves together with the fly wheel to provide a housing for the clutch operating mechanism. Secured to the inner face of the plate 12 in any desired manner as by means of bolts 14 is an annular ring 15 upon which is pivotally mounted at suitable intervals a plurality of levers 16 having inwardly extending bent arms 17 whereby they may be actuated to force the plate 18 into engagement with the clutch disc for clamping the disc to the fly wheel thus transmitting movement from the engine shaft to the clutch shaft. Each of the inwardly extending levers 17 is provided with a bent portion adapted to lie within a groove 20 formed in a collar 21 the said collar normally being held in the position, as illustrated in Figure I of the drawings, by means of the coil spring 22 which bears at one end against the inner surface of the plate 12 and at the other end against the collar 21 to normally retain the same in position whereby the clutch disc will be frictionally engaged by the fly wheel to rotate the clutch shaft. Extending within the collar 21 is a clutch actuating sleeve 23 which is secured to the collar 21 by means of a locked nut 24 and extends rearwardly therefrom around the clutch shaft 6, the sleeve 23 being provided near the rear end portion thereof with a fixed ring 25 and a movable ring 26 which rings are separated by a thrust bearing 27. The forked arms 28 of the clutch lever 29 engage the ring 26 for the purpose of sliding the collar 21 rearwardly and thus freeing the clutch disc from driving engagement with the fly wheel. Positioned at the rear of the clutch shaft is the usual or any desired form of transmission mechanism whereby power is communicated in the usual manner to the wheels of a motor vehicle.

The fly wheel 5 is connected to the engine shaft by means of bolts 30 passing through a portion of the fly wheel and a plate 31 formed integral with or firmly secured to the engine shaft. A chamber 32 is provided between the plate 31 and the fly wheel within which lubricant may be retained to suitably lubricate the bearing 8. The clutch shaft 6 is provided with a passage 33 formed substantially centrally thereof and extending inwardly from one end portion of the shaft to a point somewhat in the rear of the normal position of the clutch actuating sleeve 23. A radial passage 34 is formed in the clutch shaft 6 and communicates with the central passage 33 adjacent the rear end portion thereof, while a similar radial passage 35 is formed in the clutch shaft 6 and extends outwardly from the central passage at such a point as to supply oil to the slidable sleeve 11 mounted upon the splined portion of the clutch shaft. The clutch actuating sleeve 23 is provided with a pair of longitudinally extending grooves 36 formed upon the inner surface thereof for the purpose of suitably supplying oil to the sliding sleeve as well as to the thrust bearing 27. An opening 37 is formed in the sliding sleeve 23 at such a point as to communicate with one of the longitudinally extending grooves 36 and supply oil therefrom to the thrust bearings 27 positioned upon the outer surface of the sliding sleeve. A shoulder 38 is formed on the shaft 6 adjacent the rearward end of the sleeve 23, and the adjacent end of the sleeve 23 has an enlarged bore 39 of sufficient size to fit snugly over the shoulder 38 formed on the shaft.

The manner of operation of the mechanism above described will now be set forth more in detail. As oil carried by the transmission casing is thrown up by reason of the rotation of the fly wheel and the clutch mechanism associated therewith a certain amount of the oil will fall upon the exterior surface of the clutch shaft, and consequently upon that portion of the shaft between the shoulder 38 and the sleeve 23. When the sleeve 23 is slid upon the shaft 6 at each actuation of the clutch, the rear end portion slides over the shoulder 38 upon which it fits snugly and the oil upon that portion of the shaft adjacent the shoulder 38 is forced by the plunger action of the shoulder with the enlarged cylindrical opening in the sleeve into the radial passage 34 and the grooves 36. While the clutch is only operated at intervals sufficient oil is forced into the interior of the shaft by this means to supply the amount necessary for suitable lubrication of the bearings.

It will be observed that the rearward end portion of the passage 33 is considerably smaller than the main portion of this passage, and by reason of this fact the oil forced through the passage 34 is by the centrifugal force due to rotation of the shaft drawn forward into the enlarged portion of the passage. The oil thus forced into the passage 33 will be fed into the chamber 32 for lubricating the bearing 8 and also through the radial passage 35 from whence it serves to lubricate the sliding sleeve 11 which is slidably mounted upon the splined portion of the clutch shaft. By reason of the longitudinally extending grooves 36 formed upon the inner surface of the sleeve 23 a certain amount of the oil which falls upon the shaft will work into the grooves 36 where it serves to lubricate the bearing surfaces between the sliding sleeve and the clutch shaft. The opening 37 formed in the sliding sleeve 23 also permits a certain amount of the lubricant in the groove to pass into the thrust bearing 27 thus supplying this bearing with lubricant. It will be seen from the above description that a simple and efficient means is provided for properly lubricating the several bearings associated with the clutch shaft in such a manner that the oiling of the bearings is entirely automatic, thus obviating the necessity of supplying oil to these more or less inaccessible parts at the necessary intervals. It will be seen that the oil passing into the passage 33 works into the chamber 32 formed between the fly wheel 5 and the plate 31 thus serving to provide a constant supply for the bearing 8 supporting the forward end portion of the clutch shaft.

While I have shown and described in considerable detail a specific embodiment of my invention, it is to be understood that this showing and description is illustrative only and for the purpose of rendering my invention more clear, and that I do not regard the invention as limited to the precise details of construction illustrated or described except in so far as I have included such limitations within the terms of the following claims, in which it is my intention to claim all novelty inherent in my invention broadly as well as specifically.

What I claim as new and desire to secure by Letters Patent is:

1. In a mechanism of the class described, a shaft having a tubular end portion, a bearing for the tubular end portion of the shaft, a radial passage formed in the shaft for admitting lubricant to the bearing through the interior of the tubular portion of the shaft, and a sleeve co-operating with an enlargement provided on the shaft for forcing lubricant through said radial passage to the bearing.

2. In a mechanism of the class described, a shaft having a tubular end portion, a bearing for the tubular end portion of the shaft, a chamber communicating with the tubular end of the shaft and the bearing, and means slidable on said shaft for forcing lubricant to the chamber through the tubular portion of the shaft.

3. In a mechanism of the class described, a shaft having a tubular end portion and a radial passage communicating with the interior of the tubular opening, a clutch sleeve slidable on the shaft and having longitudinal grooves formed in the inner surface thereof for lubricating the sleeve, and means on said shaft slidable within said sleeve to force lubricant through said radial passage and the longitudinal grooves in said sleeve.

4. In a mechanism of the class described, a shaft having a central passage formed therein and a radial passage communicating with said central passage and adapted to supply lubricant thereto, a shoulder on said shaft, a clutch sleeve slidable on said shaft and provided with an enlarged opening at one end adapted to fit over the shoulder for forcing lubricant to the clutch sleeve.

5. In a mechanism of the class described, a shaft provided with a shoulder and having a central passage formed therein and radial passages extending outwardly from said central passage, bearing sleeves slidably mounted on said shafts adjacent said radial passages for receiving lubricant therefrom, one of said sleeves being provided with an annular chamber co-operating with the shoulder on the shaft to force lubricant through the passage in the shaft.

6. In a device of the character described, a hollow shaft, a bearing therefor, a clutch operating member slidable on said shaft, and means responsive to movement of said member for forcing lubricant through said shaft to said bearing.

7. In a device of the character described, a shaft having a longitudinal passage therein extending to one end thereof, a bearing at said end, a clutch operating member slidably mounted on said shaft, and means operated by movement of said member in one direction to force lubricant through the passage in said shaft to said bearing.

8. In a device of the character described, a clutch shaft, a clutch member having a bearing on said shaft, a clutch operating member mounted on said shaft, and means responsive to each actuation of said clutch in one direction for forcibly supplying lubricant to said bearing.

9. In a device of the class described, a rotatable shaft having an axial passage formed therein, radial passages extending outwardly from the axial passage to the outer surface of the shaft, and means movable on said shaft intermediate its ends for forcing lubricant into the same through one of said radial passages and out of the shaft through the other of said radial passages.

10. In a device of the class described, a shaft having a passage therein and a radial opening communicating therewith, a bearing located adjacent the discharge end of said passage, and a plunger movable longitudinally of the shaft intermediate its ends adapted to force lubricant into said radial opening and through said passage to said bearing.

11. In a device of the class described, a rotatable shaft having a longitudinal passage formed therein, a radial passage communicating with the longitudinal passage, a second radial passage leading from the longitudinal passage to a bearing surface, and means movable on the shaft between its ends, adapted to force lubricant through said passages to said bearing surface.

12. In a device of the class described, a revolubly mounted shaft having a longitudinal passage therein terminating in a transverse inlet passage located at a point intermediate the ends of the shaft, and means co-operating with the shaft and movable thereon to form a closure around the inlet end of said transverse passage, whereby to periodically force lubricant deposited upon the shaft through said passages.

13. In a device of the class described, a casing, a revoluble shaft mounted within the casing, a bearing for said shaft, said shaft having a passage formed therein leading to said bearing, a driven member within the casing adapted to splash lubricant therein upon said shaft, and movably mounted means within the casing adapted to force a portion of the lubricant deposited upon the shaft through said passage to said bearing.

14. In a device of the class described, a revolubly mounted shaft having a shoulder thereon, said shaft having a longitudinal passage terminating in a transverse inlet passage adjacent said shoulder, and a plunger adapted to be moved back and forth upon the shaft and constructed to slide over said shoulder, whereby to force lubricant through said transverse inlet passage.

In testimony whereof, I affix my signature.

ALLEN LOOMIS.